United States Patent [19]
Reil et al.

[11] Patent Number: 5,425,627
[45] Date of Patent: Jun. 20, 1995

[54] APPARATUS FOR FORMING THE NECK REGION ON A PLASTICS HALF SHELL

[75] Inventors: Wilhelm Reil, Bensheim; Bernhard Korus, Darmstadt; Heiko Bub, Bodenheim, all of Germany

[73] Assignee: Tetra Laval holdings & finance S.A., Pully, Switzerland

[21] Appl. No.: 120,037

[22] Filed: Sep. 10, 1993

[30] Foreign Application Priority Data

Sep. 10, 1992 [DE] Germany ............ 42 30 305.2

[51] Int. Cl.⁶ ........................................... B29C 51/42
[52] U.S. Cl. ................................. 425/343; 249/65; 264/314; 264/550; 425/388; 425/389; 425/504; 425/508
[58] Field of Search ............... 425/340, 341, 342, 343, 425/387.1, 388, 389, 503, 504, 508, 518, 519; 249/65; 264/522, 550, 551, 314

[56] References Cited

U.S. PATENT DOCUMENTS

| | | | |
|---|---|---|---|
| 3,234,594 | 2/1966 | Winstead | 425/342.1 |
| 3,642,975 | 2/1972 | Duggins et al. | 264/314 |
| 4,793,121 | 12/1988 | Jamison | 425/389 |
| 5,158,786 | 10/1992 | Reil et al. | 425/341 |

FOREIGN PATENT DOCUMENTS

| | | |
|---|---|---|
| 1397457 | 3/1964 | France . |
| 2204775 | 5/1974 | France . |
| 4005972 | 5/1992 | Germany . |
| 472796 | 9/1937 | United Kingdom . |

*Primary Examiner*—James P. Mackey
*Attorney, Agent, or Firm*—Michael L. Dunn

[57] ABSTRACT

A description is given of an apparatus for forming and deep-drawing the neck region at the edge of a plastics half shell, having a deep-drawing tool (3) and a counter-pressure plate (2) which are movable in two directions relative to each other, wherein the deep-drawing tool (3) embraces a deep-drawing cavity (29) in shell-like manner and has a recess (30) in the side wall (31) at the edge (32). So that deformation of the collar at the edge of the plastics half shell and also over-heating of the plastics plate for forming the half shell are avoided, according to the invention it is provided that the counter-pressure plate (2) has at least one opening (16) in the contact face (17) facing the deep-drawing tool. (3), the opening having an adjacent receiving space (19) therebehind, in which an elastic mould part (25) which is movable into at least two positions (III) is arranged in such a way that in the first retracted position (III) it is disposed flush to the rear of the contact face (17) and in the second sealed position it projects into the recess (30) at the edge (32) of the deep-drawing tool (3).

4 Claims, 5 Drawing Sheets

PRIOR ART

APPARATUS FOR FORMING THE NECK REGION ON A PLASTICS HALF SHELL

BACKGROUND OF THE INVENTION

The invention relates to an apparatus for forming and deep-drawing the neck region at the edge of a plastics half shell, having a deep-drawing tool and a counter-pressure plate which are movable in two directions relative to each other, wherein the deep-drawing tool embraces a deep-drawing cavity in shell-like manner and has a recess in the side wall at the edge.

DE-PS 40 05 972 discloses an apparatus similar to the afore-mentioned kind for deep-drawing a shell made of plastics material which is open on one side. This apparatus can be used, for example, to deep-draw two half shells which are subsequently welded and joined together by virtue of their residual heat in such a way that a hollow pack for liquids is produced. With this known apparatus. for purposes of filling, closing and pouring, a neck region was formed at the edge of each plastics half shell with a semi-cylindrical casing-like collar in such a way that after the two half shells were joined together a top was produced with a hole, at the outer edge of which a cylindrical casing-like collar projected from the top of the pack.

In order to create a recess in the neck region at the edge of the plastics half shell, for the purpose of forming this collar, the heated counter-pressure plate has been provided with a partially frustoconical projection, which, when compressed against a counter-pressure plate can be driven into a recess in same, wherein the plastics plate which is placed between the counter-pressure plate and the counter-heating plate is subject to deformation at one place on the edge where the neck region is to be produced on the plastics half shell. This was, and still is, necessary for the edge of the plastics plate to be able to be placed and pressed sealingly into the recess of the deep-drawing tool before it is deep-drawn to form the half shell. With the known apparatus, this happened by way of the projection of the counter-pressure plate which was able to be heated and to move backwards and forwards vertically. It was able to move both horizontally relative to the deep-drawing tool and also relative to the counter-heating plate, and was also able to move relative to the deep-drawing tool vertically from one operating position to the next, in order to make it possible for the workpiece, the flat plastics plate, to move from the heating position into the deep-drawing position and then to enable it to be deep-drawn in the form of the half shell.

For deep-drawing, the plastics plate has to be heated to a suitably high temperature, and this is done in the known case between various counter-pressure plates and counter-heating plates which had the drawback that in the region of the recess of the counter-heating plate the plastics plate was not heated sufficiently, at the very place where deformation of the neck region had to take place. Therefore, attempts were made to overheat the plastics plate before the neck region was formed out or rough formed, so that the forming out process or the stretching process was possible at all. However, this was disadvantageous in that non-uniform stretches in the material occurred. In addition, there has been the problem that due to the two-stage treatment of the plastics plate, namely the rough forming of the neck region in the heating position and subsequent deep-drawing in a deep-drawing position at a distance therefrom, the counter-pressure plate basically only holds the plastics plate by way of suction. During rough forming in the neck region at the edge of the plastics plate, the suction force was often insufficient, with the result that the plastics sheet migrated regionally. This undesirable migration led to deformation in the neck region, and, in particular, at the desired collar on the hole of the subsequent pack. The deformed collars resulting now and then with the ready pack also resulted in regions of unsealing.

BRIEF DESCRIPTION OF THE INVENTION

The aim of the invention therefore is to improve the forming- and deep-drawing apparatus of the kind mentioned in the introduction in such a way that deformation to the collar at the edge of a plastics half shell and also overheating of the plastics plate are avoided.

This problem is solved according to the invention in that the counter-pressure plate in the contact face facing the deep-drawing tool has at least one opening with an adjacent receiving space behind it in which an elastic mould part which is movable into at least two positions is arranged in such a way that it is disposed flush to the rear of the contact surface in the first retracted position and in the second sealed position projects into the recess at the edge of the deep-drawing tool.

By way of these new features in accordance with the invention it is possible for the heating plates to have a basically flat surface facing the oppositely disposed side. This means that the originally flat plastics plate can be placed with good heat contact flat on the heating plate in question and heated all the way through. This procedure may be continued up until the last heating position whence the plastics plate which has been heated to the deep-drawing temperature is then released and conveyed to the deep-drawing tool. The time for the heating operation is significantly increased thereby, and it is possible for deformation of the neck region at the edge of the plastics plate which is initially still flat and which will later become the plastics half shell to be effected still in the deep-drawing region. The forming operation is therefore no longer effected in two stages, but advantageously in one stage only. In that stage, namely in the deep-drawing position, the deep-drawing tool and counter-pressure plate can be pressed together firmly mechanically in such a way that the plastics plate is firmly held like a frame prior to deep-drawing, even if the forming out operation of the neck region at the edge takes place first. This means that migration of the plastics sheet from the counter-pressure plate is excluded.

It is also advantageous according to the invention if the elastic mould part is made of rubber, and on the outside has two anchoring feet and in the centre a central portion which matches the contour of the recess at the edge of the deep-drawing tool, the central portion being connected to the anchoring feet by way of a hinge. Admittedly, the mould part can also be made from many elastomer materials, possibly even with a join between non-elastic and elastic regions. However, the use of rubber for the elastic mould part is particularly advantageous. The forming operation from the rubber can be effected in many ways. The partly frustoconical projection of the above-described known apparatus is thus replaced according to the invention by the mould part which disappears behind the contact face of the counter-pressure plate or which remains within the outer contour of the counter-pressure plate, as long as the plastics plate is being heated. Only when the plastics plate is conveyed into the deep-drawing position after it has been heated sufficiently does the elastic mould part come into operation, in this case the central part of this mould part which is responsible for the actual deformation operation. The elastic mould part can be held in the afore-mentioned receiving space by the anchoring feet, whilst the contact face of the central part can move in projecting manner outwards from the space. With this movement, the plastics plate which is disposed in front of it is held, naturally only in the edge region, and is deformed by a kind of buckling movement. Provided between the central part of the elastic mould part and its anchoring feet is a hinge which can be L-shaped in the plan view, Z-shaped or bent in any other way. It is therefore possible for the outwardly arranged anchoring feet of the mould part to be held, whilst mechanical means or liquids can move the central part to deform the neck region at the edge of the plastics plate. This movement happens from the region behind the contact face of the counter-pressure plate into the region outside the external contour thereof, through said opening in the contact face. This small opening only needs to allow the central part to pass through it, and so it can be very small, being approximately the size of the projection of the desired neck region of the plastics half shell. Only this small opening is missing from the last heating position for heating the plastics plate, since the counter-pressure plate has here one or more small openings. However, this has hardly any adverse effect on the heating process, and any adverse effect which it does have is insignificant compared with the known apparatus.

With another advantageous embodiment of the invention, the height of the elastic mould part is approximately equal to the height of the opening in the counter-pressure plate and approximately equal to the height of the neck of the plastics half shell. This neck corresponds to the afore-mentioned collar, and it is thus equal in height to that of the semi-cylindrical casing on the subsequent plastics half shell. It is to be appreciated that to arrange an expedient pouring device on the hole in the top of a pack for liquids, the collar need not be particularly high. Therefore, the height of the neck of the plastics plate according to the invention is a maximum of 20 mm, but is preferably in the region of between 5 and 15 mm, wherein it is particularly preferable if the height of the neck and thus also the height of the opening in the counter-pressure plate is 10 mm.

The width of the central part, measured transversely to this height, is between 20 and 50 mm, preferably between 30 and 45 mm, wherein a particularly preferable value is 37 mm.

With this particularly preferable embodiment, the anchoring feet are disposed at a total distance of between 60 and 90 mm apart, preferably about 75 mm apart.

It can also be provided according to the invention that the receiving space in the counter-pressure plate is provided with means for holding the anchoring feet of the elastic mould part and is provided with openings for liquids. Expediently, the receiving space can be produced in a particularly simple and cost-effective way by a contact plate provided with holes being placed on a rearward heating plate and being fixed thereto, wherein the receiving space is disposed substantially in this contact plate. The anchoring feet of the elastic mould part can be fixed in this contact plate by means of steel squares, or the like, possibly even when the contact plate is being arranged on the heating plate which together form the counter-pressure plate. The heating plate, i.e. the rearward part of the counter-pressure plate can expediently be provided with openings for liquids to which pipes are connected. Here, liquids, or preferably air, can expediently be provided as the flow medium, which, by way of an appropriate control means, ensure that the central part of the elastic mould part is pushed out of said opening in the contact face in such a way that the elastic mould part projects to the front of the contact face, resulting in deformation to the edge region of the plastics plate in front of it.

It is also expedient according to the invention if provided on the outer surface, facing the deep-drawing tool, of the central portion of the elastic mould part is an edge. During deep-drawing, this edge or shoulder prevents the mould part from being pushed away as a result of overpressure in the deep-drawing tool. The elastic mould part is used to seal the recess, necessary for forming the neck region, to the edge of the deep-drawing tool. The deep-drawing tool embraces the deep-drawing cavity in shell-like manner, the volume of which cavity is covered over at the front by the flat plastics plate placed thereupon and is thus sealed. However, at the side in the neck region of the plastics half shell which is to be formed subsequently there is the afore-mentioned recess which would prevent deep-drawing, i.e. an overpressure or underpressure in the deep-drawing cavity until it is sufficiently sealed. The elastic mould part has a certain surface which covers the recess at the edge of the deep-drawing tool, and the pressure prevailing in the deep-drawing cavity attempts to push the central part of this elastic mould part out of the recess at the edge of the deep-drawing tool. The border according to the invention is provided for the very purpose of preventing this from happening.

It is also advantageous according to the invention if the counter-pressure plate is provided with a plurality of openings with receiving spaces which widen therebehind. In this way it is possible to use a larger plastics plate in order to simultaneously form an entire series of plastics half shells, wherein the neck region can be the same or similar in design. Therefore, a plurality of half shells can be formed in one cycle, as is the case with previously known apparatus.

BRIEF DESCRIPTION OF THE DRAWINGS

Further advantages, features and possible applications of the present invention will emerge from the following description of a preferred embodiment, given in conjunction with the accompanying drawings, wherein.

DETAILED DESCRIPTION OF THE INVENTION

Figure 1:
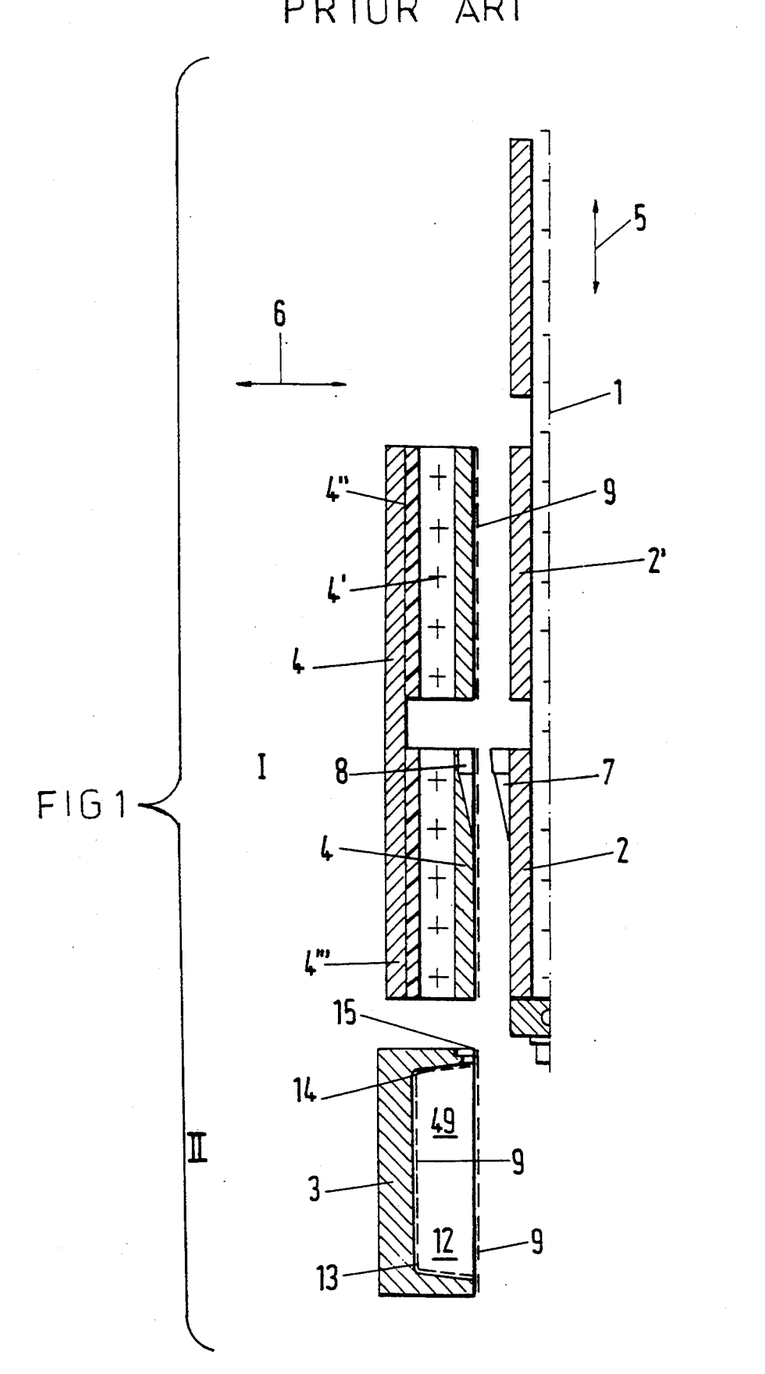
FIG. 1 shows schematically the side view of counter-heating plates and counter-pressure plates and of the deep-drawing tool, such as can be actuated with the known apparatus with fixed projections or recesses, in order to better show the domain of application of the apparatus according to the invention.

In FIG. 1, a schematic illustration is given in the centre of a so-called feed heating jaw 1 on which various counter-pressure plates 2, 2' are arranged in various positions over one another, wherein only the bottommost position I is shown here, beneath which a deep-drawing tool 3 is shown in position II. The counter heating plate 4 with heating means 4', insulating plate 4" and carrier plate 4''' is disposed opposite the counter-pressure plate 2 at a spacing away therefrom, and the carrier plate is capable of holding a plurality of counter heating plates 4 on top of one another. The feed heating jaw 1 can be moved up and down vertically in the direction of the two-directional arrow 5, wherein the feed heating jaw is shown in the upper position in FIG. 1, and the counter-heating plates 4 which are twofold here are movable backwards and forwards horizontally in the direction of the arrow 6 towards the feed heating jaw 1. In FIG. 1, they are shown in the left position where they are disposed at a spacing away from the counter-pressure plate 2.

With the known apparatus, the counter-pressure plate has a partly frustoconical projection 7 at the top, and a recess 8 is provided in the counter-heating plate 4 in the appropriate way so that the projection 7 is accommodated in the recess 8 when the two plates 2 and 4 are moved together.

The outline of the plastics plate 9 is shown. It is also straight in the heating position I, i.e. it is shown as a flat plate since this is either the condition prior to forming the neck region or represents the edge after the neck region is formed out.

Therefore, in the deep-drawing position II, the broken line is also shown both on the outside for the edge 10 disposed in the plane (FIG. 2) of the half shell 11 and also on the inside where the side walls 12, the bottom 13 and also the top 14 with the semi-cylindrical casing-like neck 15 is designed in collar-like fashion.

Figure 3A:
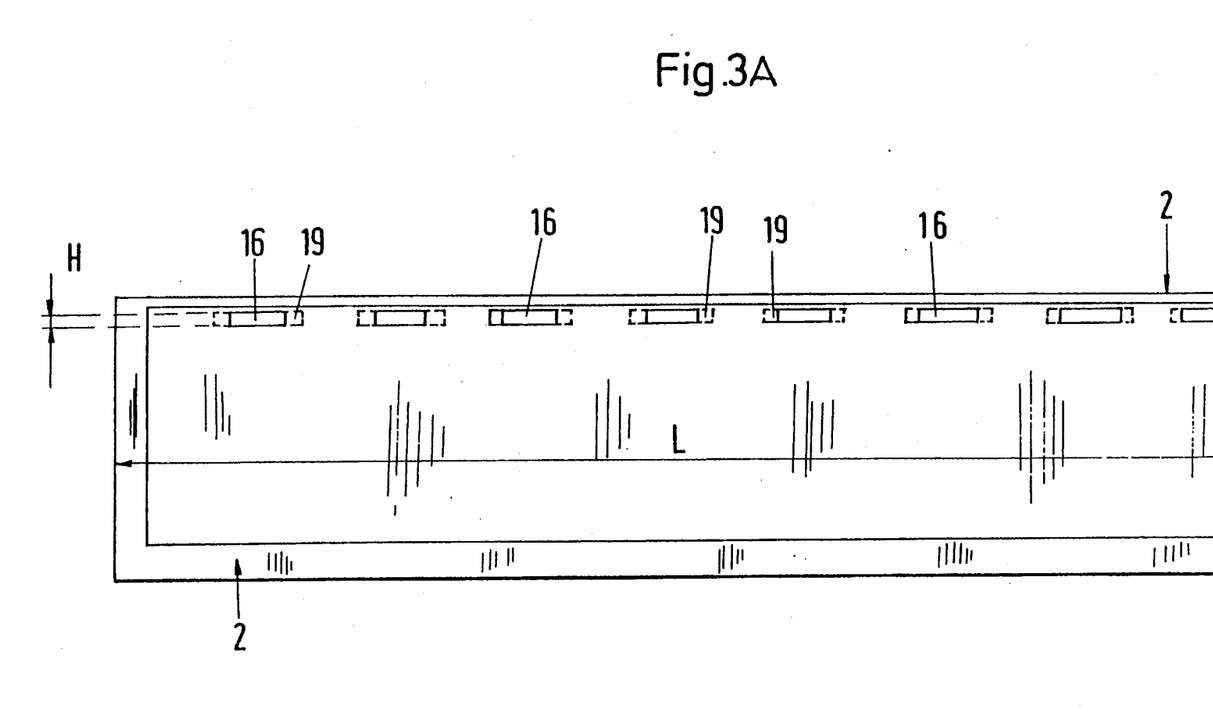
FIG. 3 is the plan view of the counter-heating plate with the plurality of openings, wherein the receiving spaces which widen to the rear are marked by broken lines, and to the right thereof is a side view.
Figure 3B:
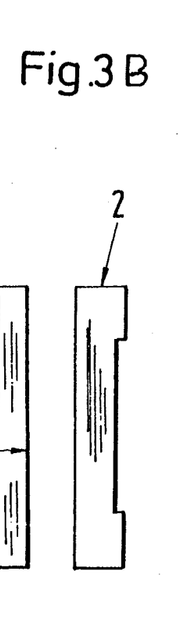

According to the invention, FIG. 3 shows the counter-pressure plate 2 which is seen if the openings 16 provided according to the invention, with the projections 7 in FIG. 1 omitted, are arranged with the receiving spaces 19 which widen behind it. The counter-pressure plate 2 is of the length L, since eight openings 16 are arranged in a row behind one another, so that eight half shells 11 can be formed simultaneously in such a way that one edge 10 is joined to the adjacent one.

Figure 7:
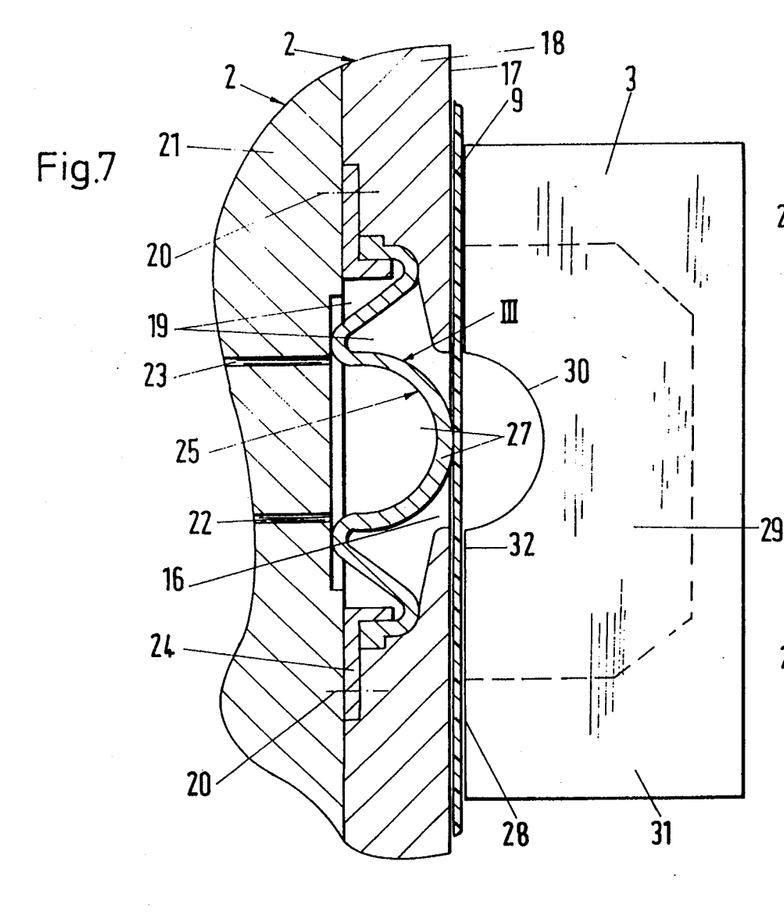
FIG. 7 is a broken away schematic view to the right of the deep-drawing tool with a deep-drawing cavity which is still open outwardly and the counter-pressure plate which is arranged to the left and oppositely disposed to the deep-drawing tool.
Figure 8:
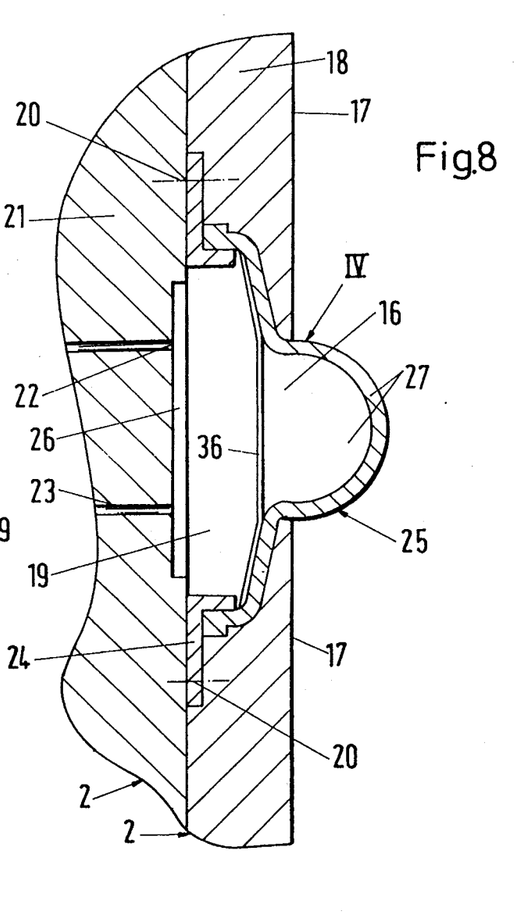
FIG. 8 is the counter-pressure plate after the central part of the elastic mould part has been blown out.

The special design of the counter-pressure plate 2 with the openings 16 disposed therein can best be described with the aid of FIGS. 7 and 8. These drawings show, in a broken away view, a sectional representation of the front parts of the counter-pressure plate 2, namely the front parts which are directly adjacent to the flat contact face 17 which faces the deep-drawing tool 3.

The contact face 17 is the flat surface of a so-called contact plate 18 in which—looking from the right to the left in FIGS. 7 and 8—the openings 16 are disposed which are shown in plan in FIG. 3. Since FIGS. 7 and 8 show only one cut-out section, only one opening 16 can be seen there. For manufacture-related reasons, and for the sake of simplicity, the adjacent receiving space 19 to the rear of the opening 16 is also manufactured in the contact plate 18 by milling or lathe work. The receiving space 19 widens behind the opening 16, and for this reason the sides of the receiving space 19 are shown by broken lines in FIG. 3. A fixing device 20, such as a screw means, for example, which is only marked by a broken line in FIGS. 7 and 8 joins the contact plate 18 to a heating plate 21 arranged behind the receiving space 19. The heating plate 21 of the counter-pressure plate 2 is also provided with two openings 22 for compressed air which open into the receiving space 19, behind which openings pipes 23 for compressed air are connected which are connected to compressors, not shown. In addition, disposed in the region of the fixing device 20, adjacent to the heating plate and inserted into the contact plate 18 are holding squares 24, of steel, for example, and an undercut region is created by their shape which is L-shaped in cross-section which secures the mould part generally denoted by the reference numeral 25.

When FIGS. 7 and 8 are viewed from the right, the opening 16 becomes wider to the right and the left, or according to FIGS. 7 and 8 to the top and bottom, and it thus forms the receiving space 19 for the mould part 25 which is fixedly arranged on the counter-pressure plate 2 by steel holding squares 24 by way of fixing devices 20, such as screws, for example. Disposed in the rearward part of the counter-pressure plate 2, namely of the heating plate 21, in the centre, is also a shallow depression 26 to accommodate the central part 27 of the elastic mould part 25, to be more exact to support it at the edge, as shown in the position of the mould part 25 in FIG. 7. It is noted that the central part 27 of the elastic mould part 25 is in the form—if only partly hollow—of a plate which is cut away on one side, or a disc, for this disc is needed to provide a sealing in the deep-drawing tool 3, in a way yet to be described.

FIG. 7 is a plan view of the deep-drawing tool 3, and here too it will be appreciated that when a counter-pressure plate 2 is used, such as shown in FIG. 3, then the deep-drawing tool 3 is of an appropriate elongate configuration and has an appropriate number of stations. However, to understand the present invention, it will suffice here to mention just one station of the deep-drawing tool 3. The front face of the deep-drawing tool 3 is flat, and during operation is disposed between the deep-drawing tool and the counter-pressure plate 2 is the plastics plate 9 which is shown broken away and in cross-section in FIG. 7, and also marked by a broken line in FIG. 1. The deep-drawing tool 3 can be imagined as a block in which a deep-drawing cavity 29 is inserted from the front face 28, the contour of which cavity is marked by a broken line in FIG. 7. In the front region, i.e. in the plane of contact 28, the deep-drawing cavity 29 is completely open. There is also an opening towards a side wall, namely the one where a semi-circle is to be seen in FIG. 7 and named as the recess 30. Thus, even if the plastics plate 9 were to be clamped between the counter-pressure plate 2 and the deep-drawing tool 3, and if the deep-drawing tool 3 clamped the plastics plate 9 like a frame in the region outside the deep-drawing cavity 29, the shell-like deep-drawing cavity 29 still communicates with the atmosphere through the dome-like recess 30. As a result of the dome-like recess 30, the part disc-like surface should be sealed by the central part 27 of the elastic mould part 25. From the plan view of FIG. 7 it is possible to see on the deep-drawing tool 3 the side wall 31 which faces the observer and behind which the deep-drawing cavity 29 is disposed (shown by broken lines). Adjacent to the edge 32 of the side wall 31, in substantially semi-circular or disc-like manner, is thus the dome-like recess 30, wherein the edge 32 of this side wall 31 is to be imagined as being arranged in the flat surface 28 of the deep drawing tool 3.

FIG. 7 shows the elastic mould part 25 in its first retracted position III in which it is also disposed with the front side of its central part 27 flush to the rear of the contact face 17 of the contact plate 18. On the other hand, FIG. 8 shows the second sealed position IV of the mould part 25 in which the central part 27 of the mould is disposed in the dome-like recess 30 at the edge 32 of the deep-drawing tool 3. It can be seen that the central part 27 projects from the contact surface 17 in approximately semi-circular manner, and also that as shown in FIG. 7 it can be withdrawn completely into the receiving space 19 behind the contact face 17 of the counter-pressure plate 2 (position III).

Figure 4:
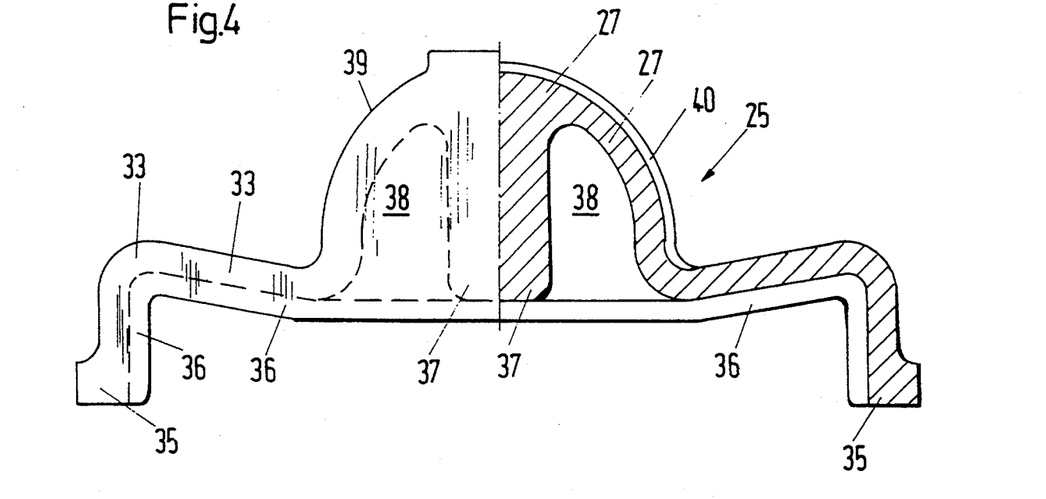
FIG. 4 is the plan view of the elastic mould part.
Figure 5:
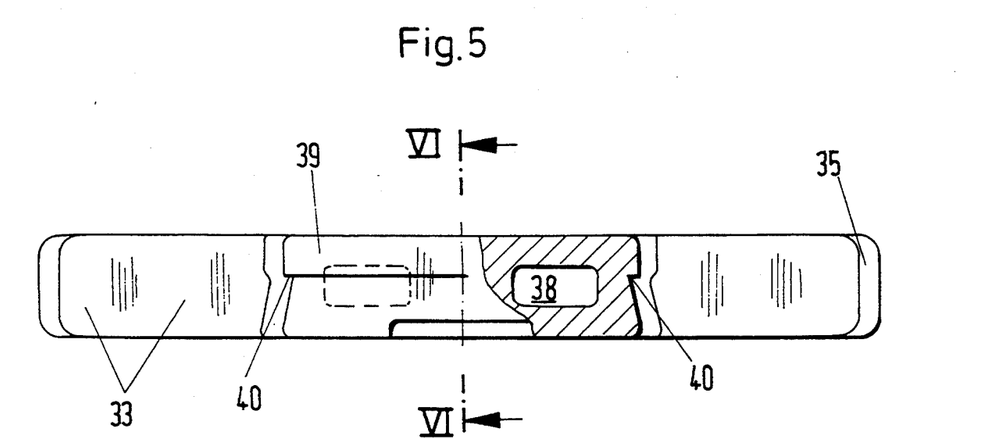
FIG. 5 is a partly broken away plan view in section of the mould part, looking from the top to the bottom in FIG. 4.
Figure 6:
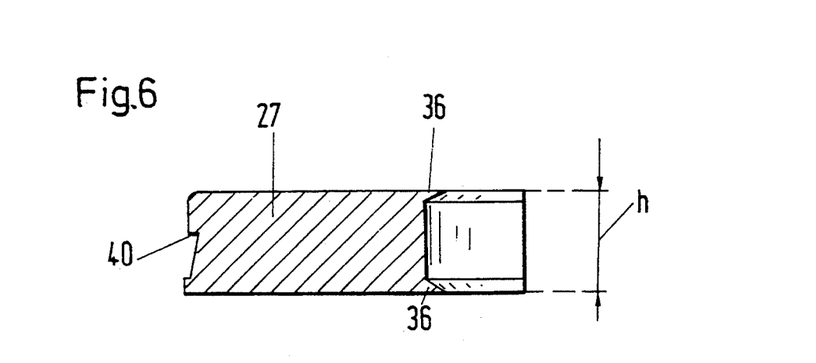
FIG. 6 is a cross-sectional view along the line VI—VI in FIG. 5.

The elastic mould part 25 made of rubber is shown in detail in FIGS. 4 to 6, and a description will now be given of it. The representation of the mould part 25 in FIG. 4 is like that in FIGS. 7 and 8. The central part 27 is seen which is connected integrally with the anchoring feet 35 on either side by way of a hinge 33. A lip 36 extends over the entire underside of the mould part 25, and this lip 36 can be seen in FIGS. 4, 6 and 8. It serves the same purpose as in a pneumatic pump, namely that when the receiving space 19 is being loaded with compressed air (in FIGS. 7 and 8 from the left), namely from the lip side, an overpressure can be created since a sealing effect is produced with the adjacent surfaces of the tool and air accumulates. This means that the mould part 25 can move from its withdrawn first position III into its extended second sealed position IV, in which the central part 27 of the elastic mould part 25 projects from the contact face 17 outwardly into the dome-like recess 30 in the deep-drawing tool 3.

For manufacture-related reasons, if it is cast from rubber, the central part 27 of the mould part 25 is provided with a support prop 37 and adjacent cavities 38. In addition, the central part 27 has a border 40 on its surface 39 which faces the deep-drawing tool 3, which border is shown in cross-section in FIGS. 5 and 6 and forms an ample semi-circular shoulder so that the part disc-like central part 27 of the elastic mould part 25 can bear, in the sealed position IV, on the border of the dome-like recess 30, in such a way that the central part 27 which is arranged substantially in the side wall 31, to be sealed, of the deep-drawing tool 3 can support itself, and is held in the plane of that side wall 31. Compressed air inside the deep-drawing cavity 29 should be prevented from pushing the central part 27 to the outside.

When in use, the apparatus operates in such a way that the plastics plate 9 according to FIG. 1 is conveyed from the top to the bottom and is therein heated until it has reached the deep-drawing temperature in the bottom-most position I. In this position I (FIG. 1), the plastics plate 9 is still flat and is heated over the entire surface thereof. It is then placed upon the counter-pressure plate 2 and it moves downwards therewith in the direction of the arrow 5 (FIG. 1) into position II where forming and deep-drawing take place.

After reaching position II, which also corresponds to the start of FIG. 7, compressed air is applied through the pressurised pipes 23 through the discharge openings 22 into the receiving space 19 for the mould part 25, to the rear of the mould part 25, so that the central part 27 moves to the right, into the dome-like recess 30, counter to the force of the plastics plate 9 which is clamped firmly like a frame between the deep-drawing tool 3 and the counter-pressure plate 2. During this movement, the neck region is formed, which, as shown in perspective in FIG. 2, is semi-circular.

Figure 2:
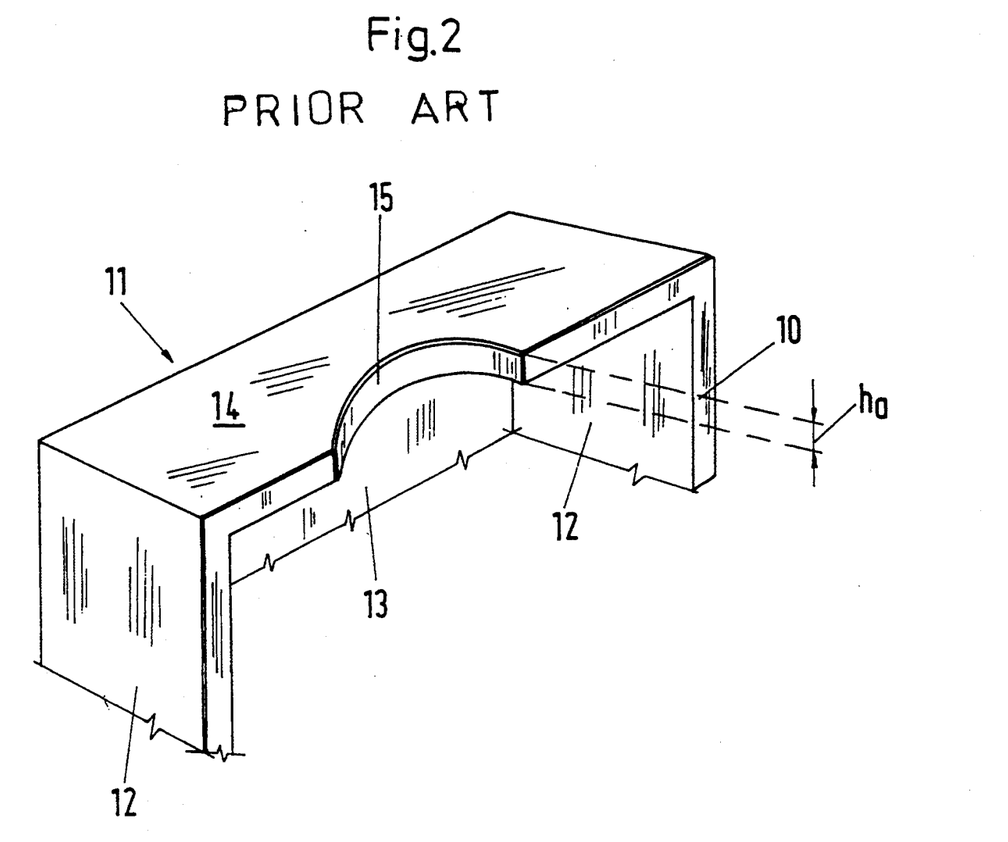
FIG. 2 is a broken away view in perspective of the upper part of a plastics half shell after the deep-drawing process, and after removal from the mould, with the neck region on the edge of the half shell.

In the same stage II, overpressure is also applied from the side of the counter-pressure plate 2 in such a way that the plastics plate 9 is formed into a half shell 11 by being placed against the inner walls of the deep-drawing cavity 29, as shown in FIG. 2. Deep-drawing is possible since the dome-like recess 30 of the side wall 31 of the deep-drawing tool 3 is sealed and thus the entire deep-drawing cavity 29 is sealed outwardly. This was the purpose of the elastic mould part 25.

Thus, whilst the anchoring feet 35 of the mould part 25 are held in the way shown in FIGS. 7 and 8 by the steel squares 24, the hinge 33 permits uniform, harmonious movement of the central part 27 from the first, retracted position III shown in FIG. 7 into the second sealed position IV shown in FIG. 8. In this latter position, sealing is fully completed. Even before sealing, and thus before the mould part 25 ceases to move, the plastics plate 9 begins to be subjected to overpressure in such a way that it is pressed into the deep-drawing cavity 29. It will be appreciated that there are no air pipes for allowing air behind the plastics plate 9 in the deep-drawing cavity 29 to escape. Both movements are thus made either in succession without any time delay; but preferably in the operational manner described here in overlapping manner. That is to say that the central part 27 is still completely in its second sealed position IV, since the plastics plate 9 is already being loaded by pressure from the side of the counter-pressure plate, and the deep-drawing process begins. The overlapping is provided so that the material of the plastics plate 9 extends harmoniously. Lastly, the collar 15 shown in FIG. 2 results, without the undesirable deformation mentioned in the introduction occurring.

We claim:

1. An apparatus, for forming and deep drawing a neck region at an edge of a plastics half shell (11) from a solid plastic sheet, having a means for heating said sheet above a deformation temperature, a deep drawing tool (3) and a counter-pressure plate (2) which are movable in both parallel and perpendicular directions (5,6) relative to each other, wherein the deep-drawing tool (3) embraces a deep-drawing cavity (29) having a recess (30), having a central portion, in a side wall (31) at an edge (32) of the deep drawing tool, characterized in that the counter-pressure plate (2) has at least one opening (16) in a contact face (17) facing the deep-drawing tool (3), the opening having a receiving space (19) in which an elastic mould part (25), which is capable of moving into at least a first retracted position (III) and a second sealed position (IV), is arranged in such a way that in the first retracted position (III) the mold part (25) is disposed flush behind the contact face (17) and in the second sealed position (IV) the mold part projects into the recess (30) at the edge (32) of the deep-drawing tool (3), said plastic mold part having a central portion which is maintained in the shape of the central portion of the recess.

2. An apparatus according to claim 1, characterized in that the elastic mould part (25) is made of rubber, and on an outside has two anchoring feet (35) and a central portion (27) which matches the contour of the recess (3) at the edge (32) of the deep-drawing tool (3), the central portion being connected to the anchoring feet (35) by way of a hinge (33).

3. An apparatus according to claim 2, characterized in that the receiving space (19) in the counter-pressure plate (2) is provided with means (24) for holding the anchoring feet (35) of the elastic mould part (25) and is provided with openings (22).

4. An apparatus according to claim 1, characterized in that the counter-pressure plate (4) is provided with a plurality of openings (16) with receiving spaces (19) which widen therebehind.

* * * * *